US012416877B2

(12) United States Patent
Sakurai

(10) Patent No.: US 12,416,877 B2
(45) Date of Patent: Sep. 16, 2025

(54) EXPOSURE DEVICE AND IMAGE FORMING APPARATUS

(71) Applicant: CANON KABUSHIKI KAISHA, Tokyo (JP)

(72) Inventor: Yuuta Sakurai, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/731,748

(22) Filed: Jun. 3, 2024

(65) Prior Publication Data

US 2024/0419094 A1 Dec. 19, 2024

(30) Foreign Application Priority Data

Jun. 15, 2023 (JP) ................................ 2023-098334

(51) Int. Cl.
*G03G 15/04* (2006.01)
*G03G 15/043* (2006.01)
*G03G 21/16* (2006.01)

(52) U.S. Cl.
CPC ... *G03G 15/04036* (2013.01); *G03G 15/0435* (2013.01); *G03G 21/1652* (2013.01)

(58) Field of Classification Search
CPC ......... G03G 15/04036; G03G 15/0435; G03G 21/1652
USPC ................................................. 399/177, 218
See application file for complete search history.

(56) References Cited

U.S. PATENT DOCUMENTS 6,809,752 B2 10/2004 Nagamine
9,217,946 B1 * 12/2015 Okazaki ........... G03G 15/04054

FOREIGN PATENT DOCUMENTS

TW 1325521 * 6/2010

* cited by examiner

*Primary Examiner* — Hoan H Tran
(74) *Attorney, Agent, or Firm* — ROSSI, KIMMS & McDOWELL LLP

(57) ABSTRACT

An exposure device that exposes a photoconductor, includes a substrate having one surface on which a plurality of light emitting elements is mounted and the other surface on which a contact is provided, a lens array that condenses light emitted from the light emitting elements on the photoconductor, a metal housing that has a lens support portion that supports the lens array, a first substrate support portion supports one end side of the substrate in a lateral direction, and a second substrate support portion supports the other end side of the substrate in the lateral direction, and a conductive member that has a first conductive portion in contact with the contact and a second conductive portion in contact with a surface of the first substrate support portion that supports the substrate, and allows conduction between the substrate and the metal housing.

16 Claims, 8 Drawing Sheets

EXPOSURE DEVICE AND IMAGE FORMING APPARATUS

BACKGROUND OF THE INVENTION

Field of the Invention

The present invention relates to an exposure device including a light emitting element that exposes a photoconductor and an image forming apparatus including the exposure device.

Description of the Related Art

In an electrophotographic-system image forming apparatus, there is a solid exposure head as one of exposure devices including a light emitting element that exposes a photoconductive drum. The solid exposure head includes, as a light emitting element, a light emitting diode (LED), or an organic electro luminescence (EL) element.

In the above exposure head, a substrate on which a plurality of light emitting elements arranged in a main scanning direction is mounted and a lens that condenses light emitted from the light emitting element on a photoconductive drum are held by a holder. A resin is used as a material of the holder, and a metal may be used to reduce deformation due to heat generated by light emission of the light emitting element.

It is necessary to ground the substrate on which the light emitting element is provided in order to reduce the generation of noise. U.S. Pat. No. 6,809,752 discloses a configuration in which a conductive base that supports a substrate and the outside of a metallic holder are electrically connected via a clamp to ground the substrate.

Incidentally, in an image forming apparatus using a solid exposure head, downsizing in the lateral direction of a substrate may be required depending on a positional relationship with components existing around the exposure head. In the case of a configuration in which the outside of the holder is clamped as in U.S. Pat. No. 6,809,752, there is a possibility that the size of the exposure head in a substrate lateral direction will be increased. In view of the above problems, it is desirable to provide an exposure head that electrically connects a substrate and a holder while curbing a possibility of an increase in size of the exposure head in a lateral direction of the substrate.

SUMMARY OF THE INVENTION

A representative configuration of the present invention is an exposure device that exposes a photoconductor, the exposure device including a substrate that has a longitudinal shape extending in an axis direction of the photoconductor, the substrate having one surface on which a plurality of light emitting elements arranged in a longitudinal direction of the substrate is mounted and the other surface on which a contact is provided; a lens array that condenses light emitted from the light emitting elements on the photoconductor; a metal housing that has a lens support portion that supports the lens array, a first substrate support portion that extends from the lens support portion in a direction away from the photoconductor and supports one end side of the substrate in a lateral direction, and a second substrate support portion that extends from the lens support portion in a direction away from the photoconductor and supports the other end side of the substrate in the lateral direction; and a conductive member that has a first conductive portion in contact with the contact and a second conductive portion in contact with a surface of the first substrate support portion that supports the substrate, and allows conduction between the substrate and the metal housing.

Further features of the present invention will become apparent from the following description of exemplary embodiments with reference to the attached drawings.

DESCRIPTION OF THE EMBODIMENTS

Hereinafter, embodiments of the present invention will be exemplarily described in detail with reference to the drawings. Note that dimensions, materials, shapes, relative arrangements, and the like of the components described below are merely examples, and the scope of the present invention is not intended to be limited thereto.

First Embodiment (Image Forming Apparatus)

Figure 1:
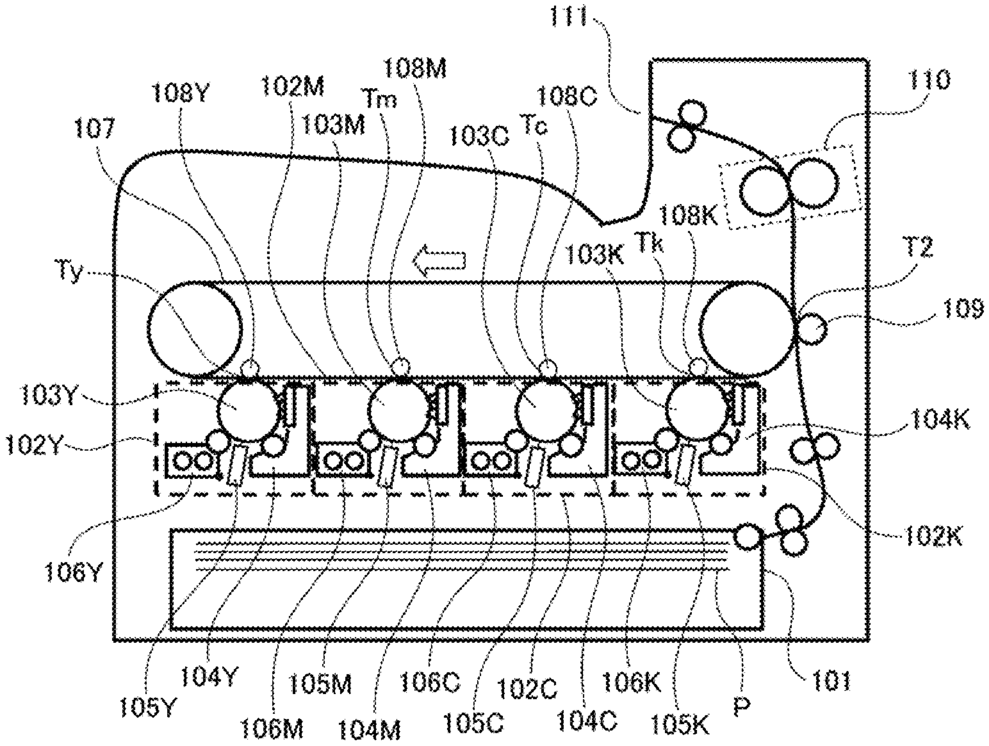
FIG. 1 is a schematic cross-sectional view of an image forming apparatus.

First, a schematic configuration of an image forming apparatus will be described with reference to FIG. 1. FIG. 1 is a schematic cross-sectional view of an image forming apparatus.

The image forming apparatus illustrated in FIG. 1 includes four image forming portions 102Y, 102M, 102C, and 102K that form toner images of respective colors of yellow (Y), magenta (M), cyan (C), and black (K). The image forming portions 102Y, 102M, 102C, and 102K include photoconductive drums (photoconductors) 103Y, 103M, 103C, and 103K, respectively. Chargers 104Y, 104M, 104C, and 104K, exposure devices 105Y, 105M, 105C, and 105K, and development devices 106Y, 106M, 106C, and 106K are provided around the photoconductive drum. Note that Y, M, C, and K appended to the reference numerals indicate the colors of the toner.

Hereinafter, the photoconductive drums 103Y, 103M, 103C, and 103K will also be collectively referred to as simply "photoconductive drums 103". The exposure devices 105Y, 105M, 105C, and 105K that expose the photoconductive drums 103Y, 103M, 103C, and 103K will also be collectively and simply referred to as "exposure devices 105".

(Image Forming Process)

Next, an image forming process of the image forming apparatus will be briefly described.

The photoconductive drums 103Y, 103M, 103C, and 103K uniformly charged by the chargers 104Y, 104M, 104C, and 104K are exposed by the exposure devices 105Y, 105M, 105C, and 105K, and electrostatic latent images are formed. The electrostatic latent images are developed as toner images of the respective colors by the development devices 106Y, 106M, 106C, and 106K. The toner images of the respective colors are sequentially transferred to be superimposed on an intermediate transfer belt 107 by primary transfer rollers 108Y, 108M, 108C, and 108K at primary transfer portions Ty, Tm, Tc, and Tk.

The toner images of the respective colors superimposed on the intermediate transfer belt 107 are collectively transferred by a secondary transfer roller 109 onto a recording sheet P conveyed from a sheet feeder 101 at a secondary transfer portion T2. The recording sheet P to which the toner images have been transferred is conveyed to a fixing device 110, and after the toner images are fixed by heat and pressure, the recording sheet P is discharged from a sheet discharge portion 111.

In the following description, a rotational axis direction of the photoconductive drum 103 coincides with a front-rear direction (near-far direction) of the image forming apparatus, and the near side in FIG. 1 is defined as being in a front direction and the far side is defined as being in a rear direction. The longitudinal direction of the exposure device 105 is also a direction coinciding with the front-rear direction of the image forming apparatus. That is, the rotational axis direction of the photoconductive drum 103 coincides with the longitudinal direction of the exposure device 105. One end side of the photoconductive drum 103 in the rotational axis direction is the front side (near side) defined herein, and the other end side means the rear side (far side) defined herein. One end side and the other end side of the image forming apparatus in the front-rear direction also correspond to the near side and the far side defined here.

Figure 2:
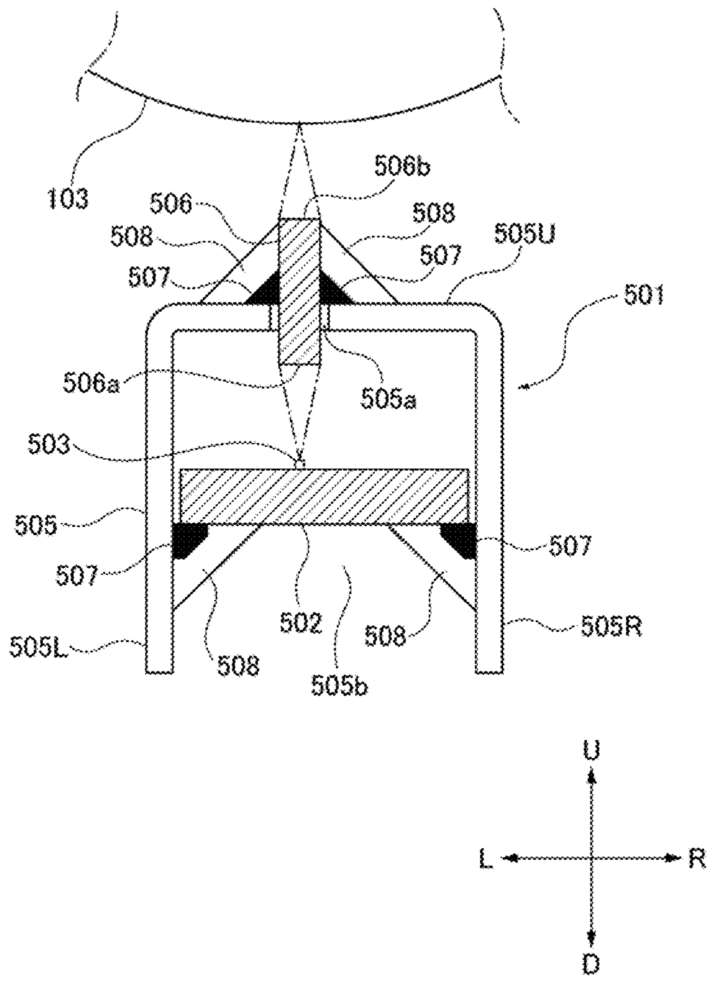
FIG. 2 is a schematic cross-sectional view of an exposure head.
Figure 3:
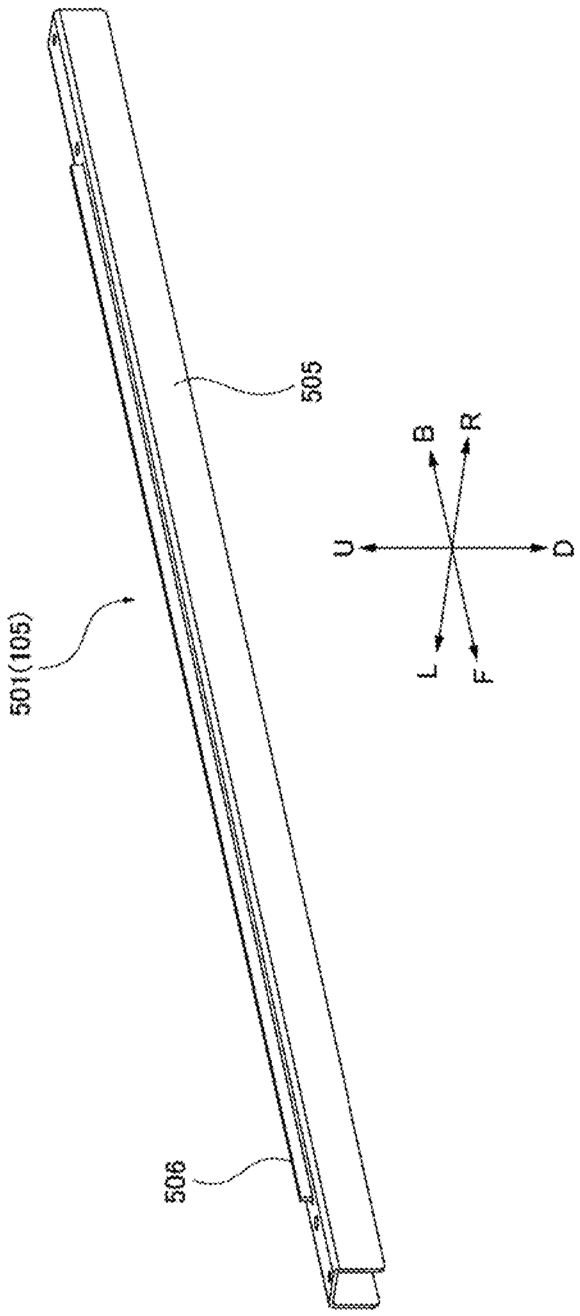
FIG. 3 is a perspective view of the exposure head.

When the photoconductive drum 103K on which an electrostatic latent image related to a black (K) toner image is formed is used as a reference, a side on which the photoconductive drum 103Y on which an electrostatic latent image related to a yellow (Y) toner image is formed is disposed is defined as a left side. When the photoconductive drum 103Y on which an electrostatic latent image related to a yellow toner image is formed is used as a reference, a side on which the photoconductive drum 103K on which an electrostatic latent image related to a black toner image is formed is disposed is defined as a right side. An upward side in a direction orthogonal to the front-rear direction and the left-right direction defined here is defined as an up direction, and a downward side in a direction orthogonal to the front-rear direction and the left-right direction defined here is defined as a down direction. The defined front direction F, rear direction B, left direction L, right direction R, up direction U, and down direction D are illustrated in FIGS. 2 and 3.

(Exposure Head)

Figure 4:
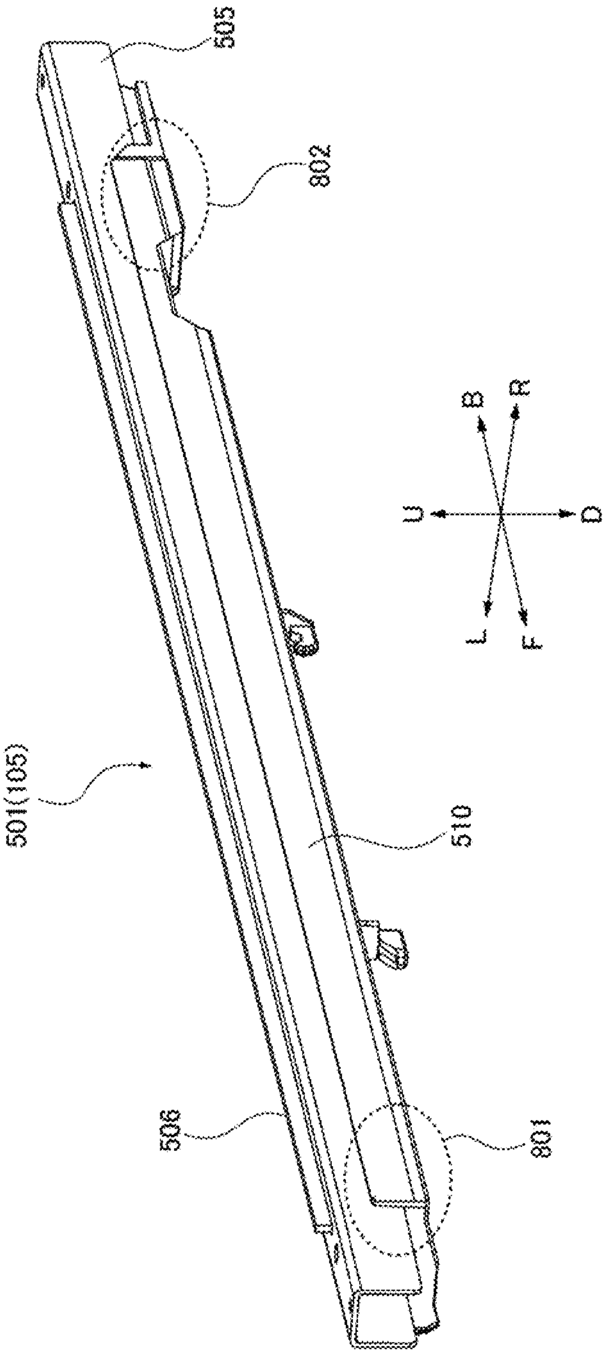
FIG. 4 is a perspective view of the exposure head.

The exposure device 105 includes an exposure head 501 described below. The exposure head 501 will be described with reference to FIGS. 2, 3, and 4. FIG. 2 is a schematic cross-sectional view of the exposure head. FIGS. 3 and 4 are perspective views of the exposure head.

The exposure head 501 has an elongated shape (longitudinal shape) extending in the axis direction of the photoconductive drum 103. The exposure head 501 includes a substrate 502, a light emitting element, a lens array 506, and a metal housing 505 that holds the substrate 502 and the lens array 506.

Note that the exposure head 501 includes a light emitting diode (LED) 503 that is a light emitting diode as a light emitting element, but is not limited thereto. For example, an organic light emitting diode (OLED) may be used. This OLED is also called an organic electro-luminescence (EL) element, and is a current-driven light emitting element.

The substrate 502 has a longitudinal shape extending in the axis direction (front-rear direction) of the photoconductive drum 103.

On one surface of the substrate 502, a plurality of LED chips on which a plurality of LEDs 503 (an example of a light emitting element) is arranged is mounted side by side in a main scanning direction (the rotational axis direction of the photoconductive drum). One surface of the substrate 502 described here is a surface (a top surface or a front surface) on which the LED chip (LED 503) is mounted, and is a surface facing the lens array 506.

The lens array 506 condenses light emitted from the light emitting element on the photoconductive drum 103. The lens array 506 is a lens assembly including a plurality of lenses. The plurality of lenses is arranged in the arrangement direction of the plurality of LEDs 503. Each lens is a cylindrical rod lens made of glass, and has a light incident surface 506*a* to which the light emitted from the LED 503 is incident and a light emitting surface 506*b* from which the light incident from the light incident surface 506*a* is emitted. A material of the lens is not limited to glass, and may be plastic. A shape of the lens is not limited to a cylindrical shape, and may be, for example, a polygonal prism shape such as a hexagonal prism shape.

The metal housing 505 holds the substrate 502 on which a plurality of LED chips is mounted side by side in the main scanning direction (rotational axis direction of the photoconductive drum) and the lens array 506 in which a plurality of cylindrical refractive index distribution type lenses is arranged side by side in the main scanning direction. The metal housing 505 holds the substrate 502 and the lens array 506 such that the LED 503 on the substrate 502 and the lens array 506 face each other. A material of the metal housing 505 is a plate material obtained by plating a galvanized steel plate or a cold-rolled steel plate later.

The lens array 506 forms an image of the light flux emitted from the LED 503 on the photoconductive drum 103 as an equal-magnification erected image. In this case, a distance from the LED 503 to the light incident surface of the lens array 506 is substantially equal to a distance from the light emitting surface of the lens array 506 to the front surface of the photoconductive drum 103.

A distance between the LED 503 and the light incident surface of the lens array 506 is required to have high accuracy on the order of microns, and this distance is strictly adjusted. The substrate 502 is moved and adjusted to a predetermined position with respect to the metal housing 505 and fixed with an adhesive 507, and the lens array 506 is adjusted in position with respect to the LED 503 on the substrate 502 and fixed to the metal housing 505 with the adhesive 507. In the present embodiment, an LED is used as a light emitting element (solid light source), and the substrate 502, the lens array 506, and the metal housing 505 that are integrally unitized are referred to as the exposure head 501.

When the lens array 506 is deformed, a direction of light after passing through the lens changes, and thus, for example, an image defect such as color deviation occurs. Therefore, the metal housing 505 that holds the lens array 506 needs to curb deformation caused by heat. Therefore, in order to dissipate heat from the metal housing 505, a material of the housing 505 in the exposure head 501 is a metal in the present embodiment.

(Metal Housing)

The metal housing 505 will be described. As illustrated in FIG. 2, the metal housing 505 holds the lens array 506 and the substrate 502 as described above. In the present embodiment, the metal housing 505 is a metal member formed by bending a plate material obtained by plating a galvanized steel plate or a cold-rolled steel plate. In the present embodiment, the metal housing 505 is formed by pressing a sheet metal such as an iron thin plate into a U shape. Hereinafter, a shape of the metal housing 505 will be described.

As illustrated in FIG. 2, the metal housing 505 has a planar portion (opposite surface) 505U in which a first opening 505*a* into which the lens array 506 is inserted is formed. The planar portion 505U is a lens support portion that supports the lens array 506. The planar portion 505U faces the photoconductive drum 103 in the optical axis direction of the lens of the lens array 506. Note that the planar portion 505U is not limited to a flat surface, and may be a slightly curved surface. The optical axis of the lens here is a line connecting the center of the light emitting surface of the lens to a focal point of the lens. The metal housing 505 has an extension portion (first substrate support portion) 505L extending in a direction away from the photoconductive drum 103 from one side of the planar portion 505U in the lateral direction. The metal housing 505 has an extension portion (second substrate support portion) 505R extending in a direction away from the photoconductive drum 103 from the other side of the planar portion 505U in the lateral direction.

The extension portion 505L and the extension portion 505R form a substrate support portion that supports the substrate 502 inserted from a second opening 505*b* in the metal housing 505. The planar portion 505U and the substrate support portions (extension portions 505L and 505R) are integrated to form the metal housing 505 that holds the lens array 506 and the substrate 502, and a cross section thereof is formed in a substantially U shape. Since the metal housing 505 is formed in a substantially U shape, the second opening 505*b* is formed on the side opposite to the planar portion 505U. The second opening 505*b* is formed between the substrate support portions (extension portions 505L and 505R) extending from the planar portion 505U to the side away from the photoconductive drum.

The substrate 502 is inserted from the second opening 505*b*, that is, from the lower side of the U-shaped metal housing 505, and is adhered to the inside of each substrate support portion (the inside of the extension portion 505L and the inside of the extension portion 505R) with the adhesive 507. Here, the inside of the extension portion 505L is a surface side of the extension portion 505L facing the extension portion 505R, and the inside of the extension portion 505R is a surface side of the extension portion 505R facing the extension portion 505L. Since a position of the substrate 502 in a focusing direction is determined by a jig (not illustrated), the exposure head 501 does not include a positioning portion of the substrate 502 in the focusing direction.

The lens array 506 is also adhered to the planar portion 505U with the adhesive 507 in a state of being inserted into the first opening 505*a* formed in the planar portion 505U. Note that the lens array 506 is fixed to the planar portion 505U after a position and an inclination thereof in the focusing direction are adjusted by a jig such that a distance in the focusing direction between all the LED chips (LEDs 503) mounted on the substrate 502 and the lens array 506 has a predetermined value. The lens array 506 is fixed to the planar portion 505U at a plurality of positions in the longitudinal direction with the adhesive 507. That is, the exposure head 501 of the present embodiment has a plurality of adhesive locations for adhering and fixing the lens array 506 inserted into the first opening 505*a* to the planar portion 505U in the longitudinal direction of the planar portion 505U.

After the substrate 502 and the lens array 506 are positionally adjusted and fixed to the metal housing 505, a gap between the substrate 502 inserted into the second opening 505*b* and the metal housing 505 (extension portions 505L and 505R) is sealed over the longitudinal direction by a sealant 508 as illustrated in FIG. 2. As a result, the LED 503 can be prevented from being contaminated by toner and dust from the outside, and a possibility that light emitted from the LED 503 is blocked by dust can be reduced.

Similarly, the sealant 508 is applied to a gap between the lens array 506 inserted into the first opening 505*a* and the metal housing 505 (planar portion 505U), and the gap is sealed by the sealant 508 over the longitudinal direction as illustrated in FIG. 2. As a result, it is possible to reduce a possibility that dust such as toner flows in from the gap between the side wall of the lens array 506 and the first opening 505*a* and the light emitted from the LED 503 is blocked by the dust.

(Resin Housing)

Figure 5:
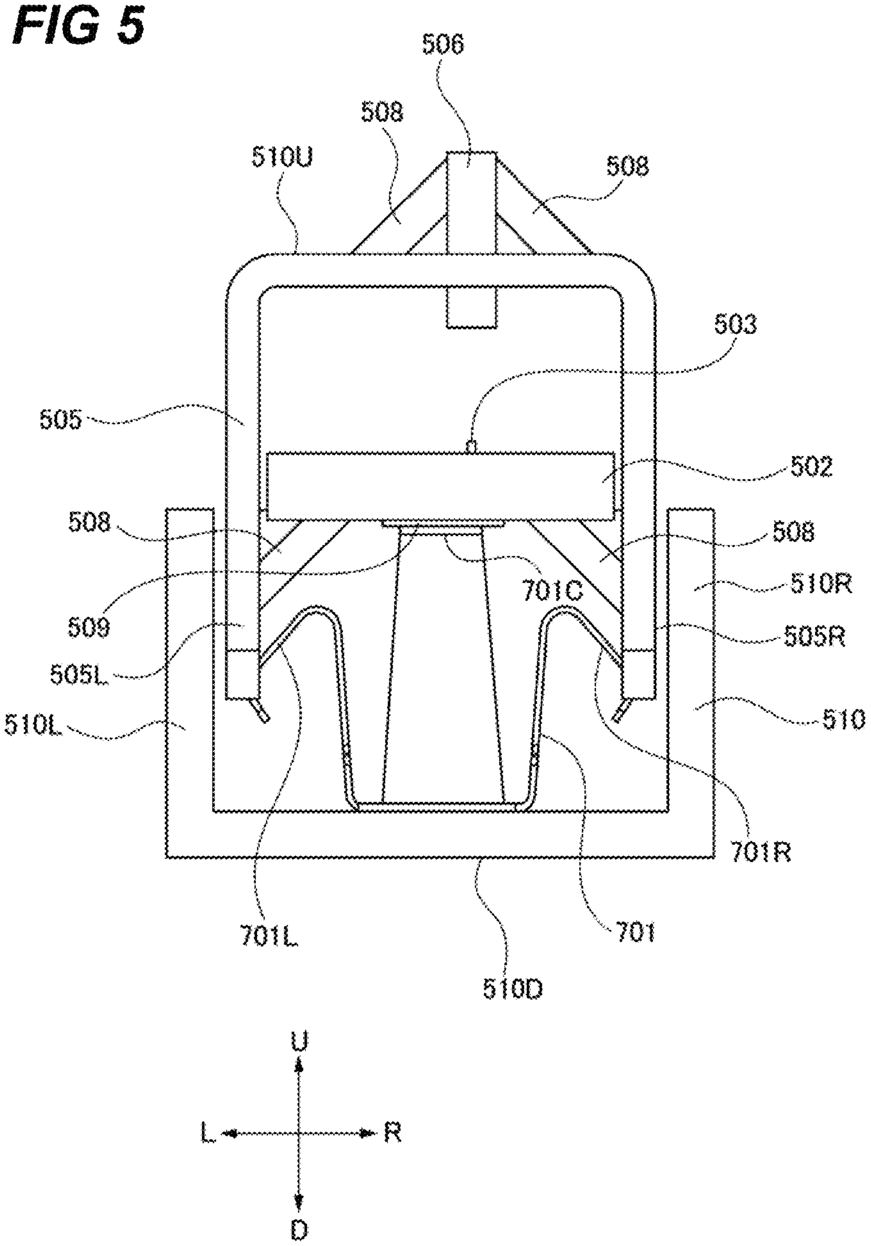
FIG. 5 is a cross-sectional view of a ground configuration of an exposure head according to a first embodiment.

The exposure head 501 has a resin housing 510 that supports the metal housing 505. FIG. 4 is a perspective view illustrating a state in which the resin housing 510 is assembled to the exposure head 501. As illustrated in FIG. 4, the resin housing 510 supports the metal housing 505 holding the substrate 502 and the lens array 506 in the longitudinal direction, and is provided integrally with the metal housing 505. The resin housing 510 is a member having a longitudinal shape extending in the axis direction of the photoconductive drum 103. As illustrated in FIG. 5, the resin housing 510 is formed in a U shape in a direction opposite to that of the metal housing 505. The resin housing 510 has a left side wall 510L that is a first side wall, a right side wall 510R that is a second side wall facing the left side wall 510L, and a bottom surface portion 510D facing the planar portion 505U of the metal housing 505 between the left side wall 510L and the right side wall 510R.

The resin housing 510 has a function of connecting the exposure head 501 to a unit (not illustrated) provided inside the main body of the image forming apparatus in a detachably attachable manner. As a unit (not illustrated) to which the exposure head 501 is connected in a detachably attachable manner, for example, there is a moving mechanism that moves the exposure head to an exposure position and a retraction position. The moving mechanism moves the exposure head to an exposure position where the photoconductive drum is exposed, and moves the exposure head to a retraction position retracted from the exposure position.

(Ground Configuration)

Next, a ground configuration of the exposure head will be described with reference to FIG. 5. FIG. 5 is a cross-sectional view of a ground configuration of the exposure head according to the first embodiment.

Figure 8:
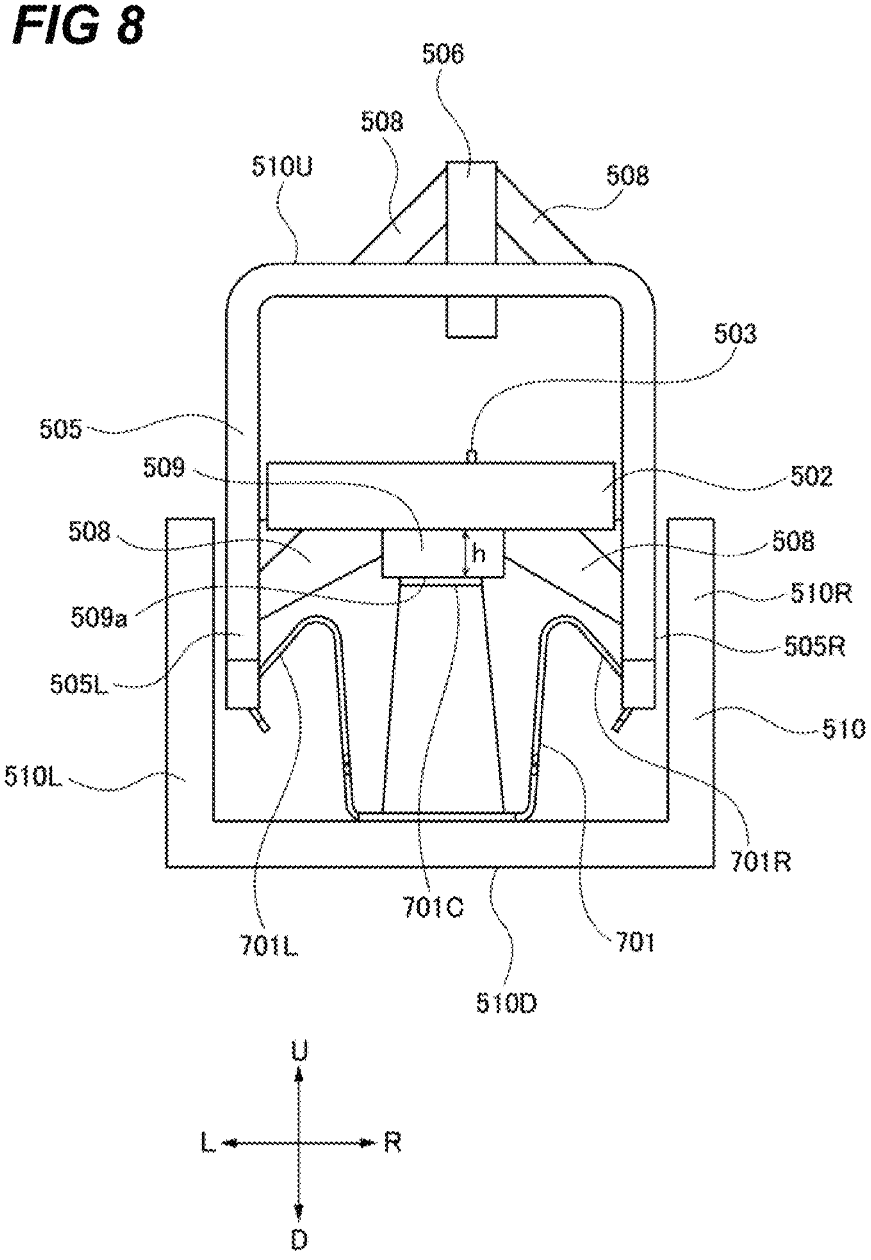
FIG. 8 is a cross-sectional view of a ground configuration of the exposure head according to the first embodiment.

A conductive portion 509 as a contact is provided on the other surface of the substrate opposite to the one surface on which the LED 503 is mounted. The conductive portion 509 is provided to protrude toward a metal conductive member 701 side that will be described later from the opposite surface of the substrate 502 in the optical axis direction. In other words, the conductive portion 509 is attached to the opposite surface of the substrate 502, and has a height protruding closer to the metal conductive member 701 that will be described later in the optical axis direction than the opposite surface. Specifically, as illustrated in FIG. 8, the conductive portion 509 has a contact surface 509*a* serving as a contact in contact with the conductive member 701. The contact surface 509*a* is provided at an end portion of the conductive portion 509 farthest from the other surface of the substrate 502. The conductive portion 509 is a protrusion protruding from the other surface of the substrate 502 in a direction away from the lens array 506, and is a metal member having a height (protrusion amount h) in the optical axis direction of the lens. Since high accuracy is required for the protrusion amount h from the other surface of the substrate 502, the conductive portion 509 is provided separately from the substrate 502 and is configured to be attached to the other surface of the substrate 502. As a result, when the gap between the substrate 502 and the metal housing 505 is sealed with the sealant 508, the contact surface (contact) 509*a* of the conductive portion 509 can be prevented from being buried by the sealant 508, and stable conduction can be secured.

The exposure head 501 includes a metal conductive member 701 that allows conduction between the substrate 502 and the metal housing 505. The metal conductive member 701 has a first conductive portion 701C, a second conductive portion 701L, and a third conductive portion 701R, and allows conduction between the substrate 502 and the metal housing 505.

The first conductive portion 701C is biased in the first direction (up direction) and is in contact with the conductive portion 509 of the substrate 502 between the extension portion 505L and the extension portion 505R. The second conductive portion 701L is biased on one side (left direction) of the second direction intersecting the first direction and is in contact with the inner surface of the extension portion 505L of the metal housing 505 (the surface facing the extension portion 505R). The third conductive portion 701R is biased on the other side (right direction) opposite to the one side in the second direction and is in contact with the inner surface of the extension portion 505R of the metal housing 505 (the surface facing the extension portion 505L).

In the present embodiment, the metal conductive member 701 is a plate spring in which the first conductive portion 701C, the second conductive portion 701L, and the third conductive portion 701R are integrally molded.

In the exposure head 501, the metal housing 505 is electrically grounded to the frame body of the image forming apparatus.

According to the present embodiment, conduction is allowed between the conductive portion 509 provided on the surface of the substrate 502 opposite to the LED mounting surface and the metal housing 505 via the metal conductive member 701. The ground configuration using the metal conductive member 701 is installed to prevent noise generated in the image forming apparatus from affecting the substrate 502 when the exposure head 501 is installed and operated in the image forming apparatus. With the above configuration, even if cut powder is generated due to sliding or the like when the metal conductive member 701 and the substrate 502 come into contact with each other, it is possible to curb the cut powder from being mixed between the LED 503 and the lens array 506, and it is possible to curb the occurrence of adverse effects on an image such as white streaks.

In the metal housing 505, the gap between one end side of the substrate 502 in the lateral direction and the extension portion 505L and the gap between the other end side of the substrate 502 in the lateral direction and the extension portion 505R are sealed with the sealant 508 over the longitudinal direction of the substrate 502. As a result, it is possible to further curb dust from being mixed between the LED 503 and the lens array 506.

The substrate 502 has two or more conductive portions 509 as the contacts. In the present embodiment, as illustrated in FIG. 4, the conductive portions 509 are provided at two locations such as one end portion (a position 801 surrounded by a dotted line) and the other end portion (a position 802 surrounded by a dotted line) in the longitudinal direction of the substrate.

The metal conductive member 701 is disposed for each conductive portion 509 of the substrate 502. In the present embodiment, as illustrated in FIG. 4, the metal conductive member 701 is provided at two locations such as one end portion (the position 801 surrounded by a dotted line) and the other end portion (the position 802 surrounded by a dotted line) in the longitudinal direction of the substrate.

As described above, by electrically connecting the exposure head 501 to the ground at a plurality of locations of two or more locations, the stability of the substrate 502 against noise can be enhanced. However, the number of locations for electrically connecting the substrate 502 of the exposure head 501 and the metal housing 505 to the ground may be one or three or more, and may be appropriately set.

The metal housing 505 of the exposure head 501 is supported by the resin housing 510. The metal conductive member 701 is held by the bottom surface portion 510D of the resin housing 510.

The metal conductive member 701 held by the resin housing 510 includes a plate spring in the present embodiment, and includes the first conductive portion 701C, the second conductive portion 701L, and the third conductive portion 701R which are three arms. Among them, the first conductive portion 701C, which is one arm, is biased in the first direction to be in contact with the conductive portion 509 of the substrate 502, and the second conductive portion 701L and the third conductive portion 701R, which are two arms, are biased in the second direction intersecting the first direction to be in contact with the metal housing 505. As a result, stable conduction between the substrate 502 and the metal housing 505 can be secured. The metal housing 505 is electrically connected to the frame body of the image forming apparatus with the ground configuration (not illustrated), and the substrate 502 is connected to the ground. As a result, it is possible to prevent noise generated in the image forming apparatus from affecting the substrate 502.

In the metal conductive member 701, the top portion of the first conductive portion 701C (the contact portion with the substrate 502) on the upper side in the up-down direction is provided above the top portions of the second conductive portion 701L and the third conductive portion 701R on the upper side in the up-down direction. In the second conductive portion 701L and the third conductive portion 701R, the contact portion with the metal conductive member 701 is provided below the top portion on the upper side in the up-down direction. The top portions on the upper side of the second conductive portion 701L and the third conductive portion 701R are provided closer to the inside than the contact portion in the left-right direction. Thus, by inserting the metal conductive member 701 upward from the second opening 505*b* side of the metal housing 505, each conductive portion of the metal conductive member 701 is biased to the substrate and the metal housing, and conduction can be achieved. Thus, the metal conductive member 701 can be easily assembled to the exposure head 501, and can easily and reliably allow conduction between the substrate 502 and the metal housing 505.

When the resin housing 510 is assembled to the exposure head 501, even if cut powder is generated in the metal conductive member 701 held by the resin housing 510 due to rubbing or the like occurring between the conductive portion 509 of the substrate 502 and the metal housing 505, the cut powder is not likely to go around to the LED 503 side because the cut powder is generated on the opposite side of the LED mounting surface of the substrate 502.

As described above, according to the present embodiment, even if cut powder is generated due to sliding or the like when the metal conductive member and the substrate come into contact with each other, it is possible to curb the cut powder from being mixed between the light emitting element and the lens array, and it is possible to curb the occurrence of adverse effects on an image such as white streaks.

Note that the metal conductive member 701 is not limited to the above configuration. The metal conductive member 701 may have at least a first conductive portion in contact with the conductive portion 509 of the substrate 502 and a second conductive portion in contact with the metal housing 505, and may be configured to conduct the substrate 502 and the metal housing 505.

Second Embodiment

An exposure head according to a second embodiment will be described. Other configurations of the exposure head except for the ground configuration are similar to those of the above-described embodiment, and thus, description thereof will be omitted here.

(Ground Configuration)

Figure 6:
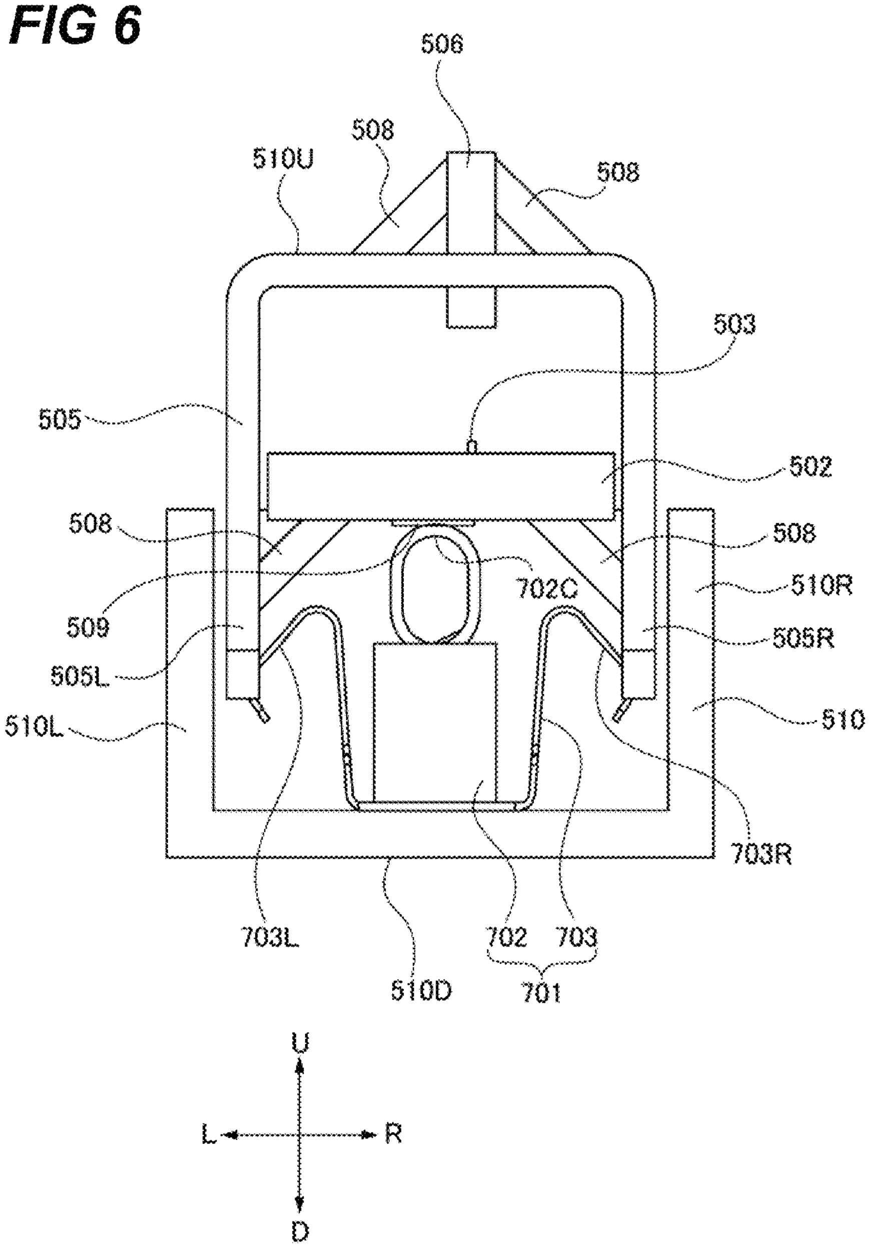
FIG. 6 is a cross-sectional view of a ground configuration of an exposure head according to a second embodiment.

A ground configuration of the exposure head according to the second embodiment will be described with reference to FIG. 6. FIG. 6 is a cross-sectional view of a ground configuration of the exposure head according to a second embodiment.

In the above-described embodiment, the metal conductive member 701 includes one conductive member (plate spring) integrally including the first conductive portion 701C, the second conductive portion 701L, and the third conductive portion 701R. That is, in the above-described embodiment, the metal conductive member 701 that is one conductive member achieves a ground configuration. However, the metal conductive member 701 is not limited thereto.

As illustrated in FIG. 6, the metal conductive member 701 according to the present example includes a first conductive member 702 having a first conductive portion 701C and a second conductive member 703 connected to the first conductive portion 701C and integrally having a second conductive portion 701L and a third conductive portion 701R. That is, the metal conductive member according to the present embodiment differs from the metal conductive member according to the above-described embodiment in the number of components, and a plurality of conductive members achieves a ground configuration.

The resin housing 510 holds the first conductive member 702 and the second conductive member 703. The first conductive member 702 has the first conductive portion 702C in contact with the substrate 502. The first conductive member 702 is a compression spring. The second conductive member 703 integrally includes the second conductive portion 703L and the third conductive portion 703R in contact with the metal housing 505. The second conductive member 703 is a plate spring in which the second conductive portion 703L and the third conductive portion 703R are integrally molded. The metal conductive member 701 according to the present embodiment has a configuration in which a compression spring that is the first conductive member 702 and a plate spring that is the second conductive member 703 connected to the compression spring are integrally provided.

The first conductive member 702 and the second conductive member 703 are biased against the plate spring that is the second conductive member 703 by using the repulsive force of the compression coil spring that is the first conductive member 702, so that stable conduction can be secured.

Since the focal depth of the lens array 506 is shallow, the substrate 502 needs to curb positional variation in the optical axis direction after fixation on the order of microns. As in the first embodiment, in the biasing to the substrate 502 by the plate spring which is one conductive member, it is necessary to increase a length of the arm and decrease a spring constant in order to curb a variation in the biasing due to an irregular position, and thus space saving may be difficult. Therefore, in the present embodiment, a compression coil spring is used for the first conductive member 702 having the first conductive portion in contact with the substrate 502. As a result, not only the same effects as those of the above-described embodiment can be achieved, but also the spring constant can be lowered and space saving can be realized.

Figure 7:
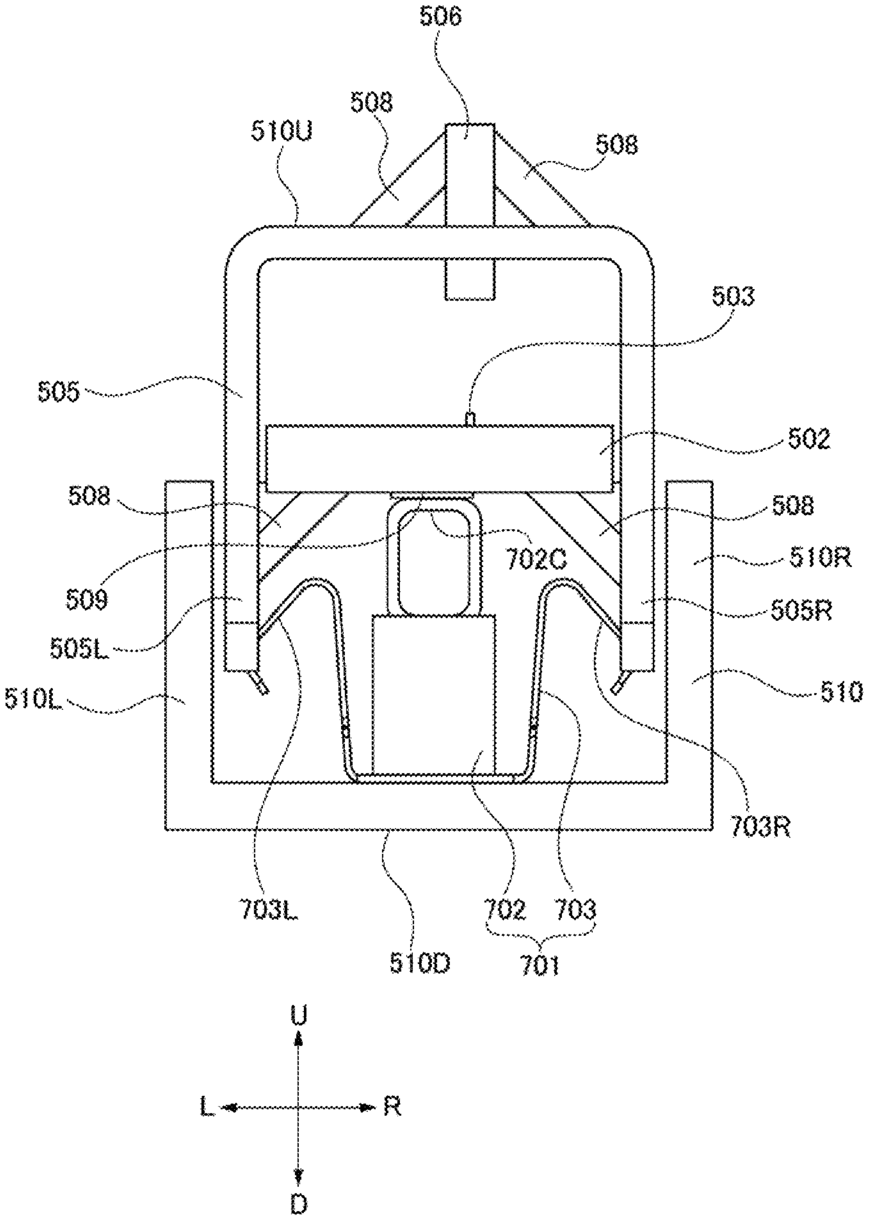
FIG. 7 is a cross-sectional view of a ground configuration of the exposure head according to the second embodiment.

In the metal conductive member 701, a portion of the first conductive portion 702C included in the first conductive member 702 in contact with the conductive portion 509 is not limited to the arc shape illustrated in FIG. 6. For example, a portion of the first conductive portion 702C included in the first conductive member 702 in contact with the conductive portion 509 may be a flat surface. Specifically, as illustrated in FIG. 7, the portion of the first conductive portion 702C in contact with the conductive portion 509 may have a planar shape in the lateral direction (left-right direction in FIG. 7) of the substrate 502. As a result, stable conduction can be secured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-098334, filed Jun. 15, 2023, which is hereby incorporated by reference herein in its entirety.

What is claimed is:

1. An exposure device that exposes a photoconductor, the exposure device comprising:

a substrate that has a longitudinal shape extending in an axis direction of the photoconductor, the substrate having one surface on which a plurality of light emitting elements arranged in a longitudinal direction of the substrate is mounted and the other surface on which a contact is provided;

a lens array that condenses light emitted from the light emitting elements on the photoconductor;

a metal housing that has a lens support portion that supports the lens array, a first substrate support portion that extends from the lens support portion in a direction away from the photoconductor and supports one end side of the substrate in a lateral direction, and a second substrate support portion that extends from the lens support portion in a direction away from the photoconductor and supports the other end side of the substrate in the lateral direction; and a conductive member that has a first conductive portion in contact with the contact and a second conductive portion in contact with a surface of the first substrate support portion that supports the substrate, and allows conduction between the substrate and the metal housing.

2. The exposure device according to claim 1, wherein the first conductive portion is biased toward the contact in a first direction that is an optical axis direction of the lens, and the second conductive portion is biased toward the first substrate support portion in a second direction orthogonal to the longitudinal direction and the first direction.

3. The exposure device according to claim 2, wherein the conductive member includes a first conductive portion that is biased in the first direction and is in contact with the contact of the substrate between the first substrate support portion and the second substrate support portion, the second conductive portion, and a third conductive portion that is in contact with a surface of the second substrate support portion that supports the substrate.

4. The exposure device according to claim 3, wherein the conductive member is a single conductive member integrally including the first conductive portion, the second conductive portion, and the third conductive portion.

5. The exposure device according to claim 4, wherein the single conductive member is a plate spring.

6. The exposure device according to claim 3, wherein the conductive member includes a first conductive member having the first conductive portion, and a second conductive member connected to the first conductive portion and integrally having the second conductive portion and the third conductive portion.

7. The exposure device according to claim 6, wherein the first conductive member is a compression spring, and the second conductive member is a plate spring.

8. The exposure device according to claim 1, wherein the metal housing is sealed with a sealant over the longitudinal direction of the substrate between the one end side of the substrate in the lateral direction and the first substrate support portion and between the other end side of the substrate in the lateral direction and the second substrate support portion.

9. The exposure device according to claim 1, wherein the exposure device has a resin housing that supports the metal housing, and the conductive member is held by the resin housing.

10. The exposure device according to claim 1, wherein the substrate has two or more of the contacts, and the conductive member is disposed at each of the contacts of the substrate.

11. The exposure device according to claim 1, further comprising a protrusion provided on the other surface of the substrate and protruding from the other surface of the substrate in a direction away from the lens, wherein the contact is provided at an end portion of the protrusion farthest from the substrate.

12. The exposure device according to claim 11, wherein the protrusion is a metal member having a height in an optical axis direction of the lens.

13. The exposure device according to claim 12, wherein the metal housing is sealed with a sealant over the longitudinal direction of the substrate between the one end side of the substrate in the lateral direction and the first substrate support portion and between the other end side of the substrate in the lateral direction and the second substrate support portion, and the sealant is not adhered to the end portion of the protrusion.

14. An image forming apparatus comprising: a photoconductor; and the exposure device according to claim 1.

15. The image forming apparatus according to claim 14, wherein the plurality of light emitting elements is organic EL elements.

16. The exposure device according to claim 1, wherein the plurality of light emitting elements is organic EL elements.

* * * * *